April 24, 1956     E. B. GAGE     2,742,814

ELECTROSTATIC COPY HOLDER

Filed Feb. 16, 1952     2 Sheets-Sheet 1

INVENTOR
E. B. GAGE
BY *W.C. Parnell*
ATTORNEY

April 24, 1956     E. B. GAGE     2,742,814
ELECTROSTATIC COPY HOLDER
Filed Feb. 16, 1952     2 Sheets-Sheet 2
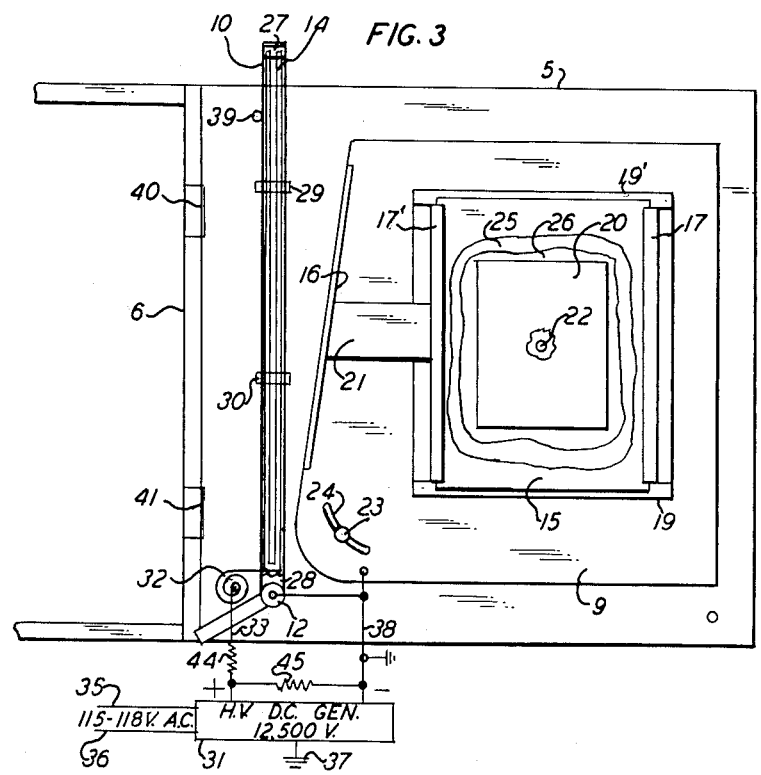
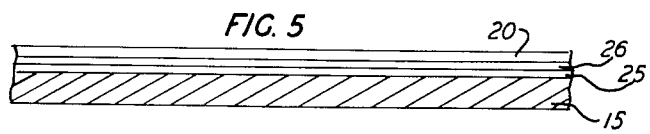
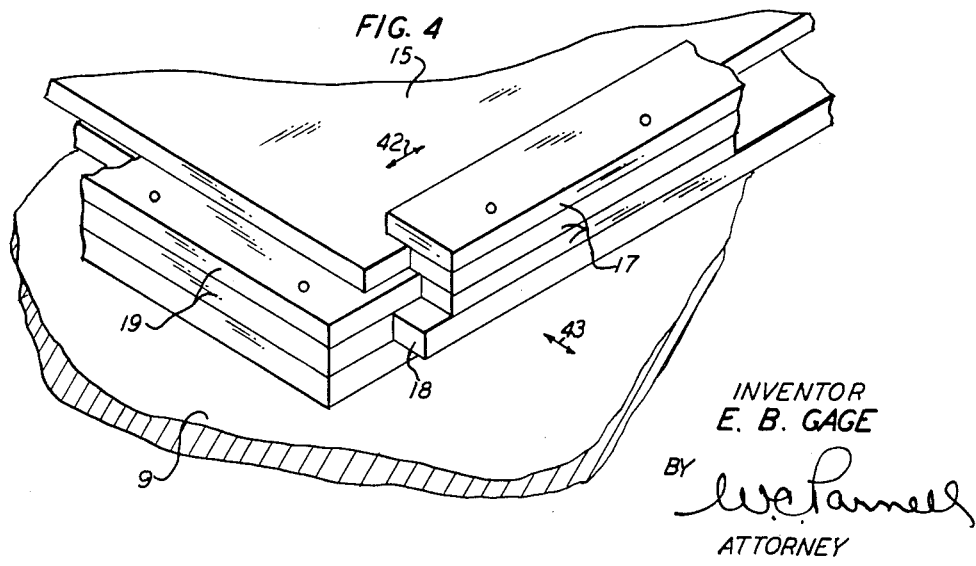
INVENTOR
E. B. GAGE
BY
ATTORNEY

United States Patent Office 2,742,814
Patented Apr. 24, 1956

2,742,814
ELECTROSTATIC COPY HOLDER

Edwin B. Gage, Montclair, N. J., assignor to Western Electric Company, Incorporated, New York, N. Y., a corporation of New York Application February 16, 1952, Serial No. 271,959

1 Claim. (Cl. 88—24)

This invention relates to the mounting of sheets or the like on a surface and particularly to the mounting of non-conductive sheets or photographic copy on a surface for photographic or other reproduction.

In the reproduction of printed matter, drawings or other material, by photographic, facsimile, xerographic, or other methods, the copy must be held in a given plane accurately. In photography the copy must be held flat in the focal plane within close limits to avoid distortion in the reproduction. In the past, copy has been mounted for this purpose by the use of suction apparatus or by a glass plate placed between the copy and the camera, against which glass plate the copy is pressed. These methods of mounting the copy have serious disadvantages. The suction apparatus required for this purpose is bulky and expensive. Furthermore, it does not lend itself to adjustable positioning of the copy in various planes, or from a convenient loading position to a desired photographing position. Also, the apparatus must be adapted to hold copy which may have a great range of sizes and stiffnesses. Finally, the hermetic seals and the valves required for turning the suction on and off may require a considerable amount of servicing. The mounting method using a glass plate between the camera and the copy has the disadvantage that a considerable amount of light may be lost in the glass by absorption. The glass plate is also difficult to keep clean and when not clean causes variations in the intensity of the reproduced copy. The definition of the reproduction may be impaired by reflection from both surfaces of the glass and also by refraction within the glass. In the xerographic reproducing process the glass is particularly objectionable since it produces an effect similar to fogging in ordinary photography, this effect being produced apparently by inherent refraction and reflection in the glass.

It is an object of this invention to overcome the disadvantages enumerated above and to produce a simple and inexpensive method and apparatus for holding sheets of copy on a surface.

It is another object of this invention to provide a method and apparatus for holding sheets of various sizes or shapes on a surface in any desired position.

It is a further object of the invention to fasten a sheet quickly, without any danger of marring it, in such a manner that the sheet thereafter remains fastened for a sufficient time to allow all photographic operations without any further application of energy.

These objects are accomplished by mounting a smooth metal plate, which usually would be flat but could have other desired shapes, on any suitable base, such as a hinged insulated supporting structure. The metal plate is coated with a material having a high dielectric strength, such as an acrylic spray containing a white, highly-reflecting, light-diffusing compound, as for example titanium dioxide. This coating is rubbed with fine steel wool to produce a plane surface, thus permitting a continuous contact with a polystyrene film, and to remove gloss and reduce specular reflection. After so rubbing, a very thin polystyrene film is stretched flat and clamped over the sprayed surface and is then rubbed with steel wool to reduce its specular reflection. The sheet of copy to be attached to the metal surface is then placed thereon. An electrode having a high direct current potential with respect to the metal plate is then swept across the copy or across the entire metal plate at a small fixed distance thereabove so that a static charge is applied to the copy. The electrode may consist of thin wires adapted to be moved across the copy as for example by an arm pivoted on the supporting structure so that as the arm is turned the wires are moved parallel to the copy at a fixed distance therefrom. The potential applied to the electrode is of such a value with respect to the potential of the metal plate that a corona discharge occurs from the wires to the top side of the copy. The charge thus placed on the copy causes electrostatic forces to be developed which hold the copy against the plate. By virtue of the fact that the copy is separated from the metallic plate by the dielectric coating and also that the copy itself is made of low conductivity material the charge on the copy will remain thereon and the copy will thus remain fixed to the metallic plate for a long time without further application of potential to the electrode.

The various objects and features of the invention will be more fully understood from the following detailed description of the illustrative embodiment shown in the accompanying drawings; wherein:

Fig. 3 is a top view partly in section of a portion of the apparatus;

Fig. 4 is a detailed view showing the means for slidably adjusting the metal plate; and Fig. 5 is an end view partly in section of the copy holding plate.

Figure 1:
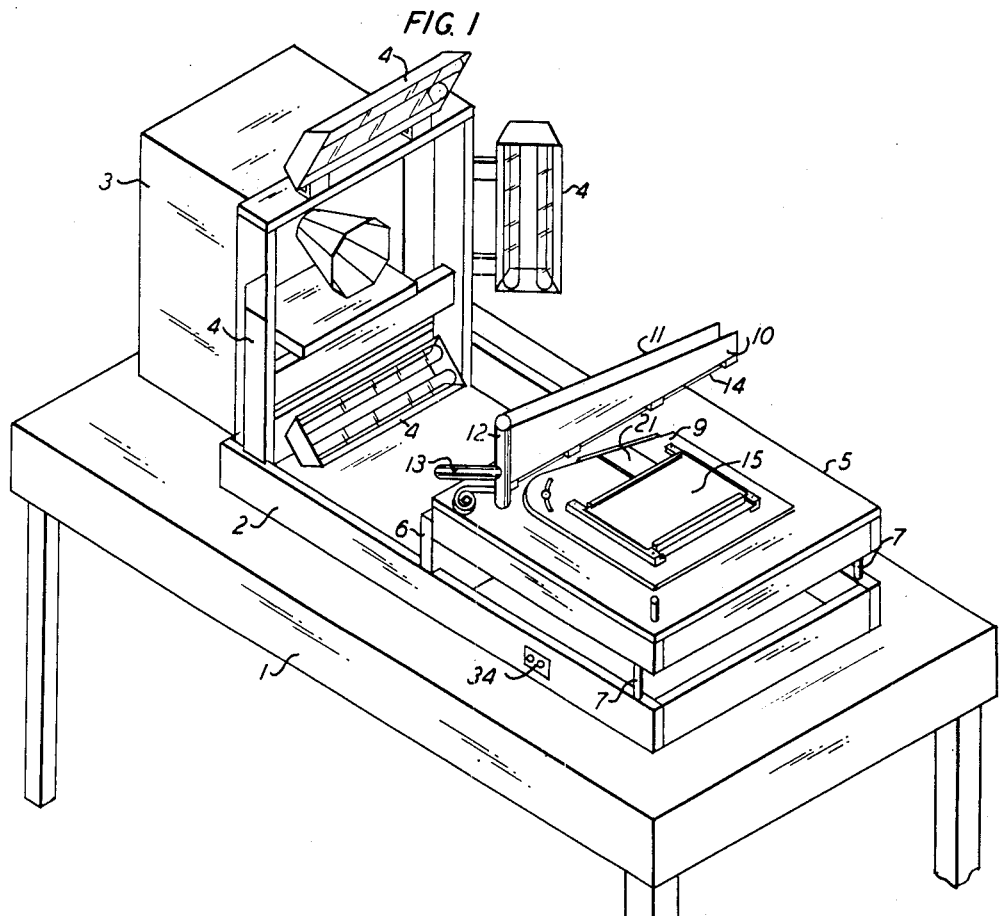
Fig. 1 is an isometric view of one embodiment of my invention.

Referring to the figures there is shown mounted on a table 1 a supporting structure or rack 2 to which is attached in any suitable manner a camera 3. The camera 3 is indicated as being of the type used for making photographic reproductions of sheets, drawings, printed material, or other photographic copy. Round the camera 3 and suitably attached thereto are banks of lights 4 for illuminating copy to be reproduced. A supporting structure or base 5 made preferably of insulating material, is mounted on rack 2 so as to be movable from the horizontal loading position indicated in Fig. 1 to the vertical photographing position shown in Fig. 2. For this purpose the base 5 may be hinged to a board 6 on rack 2. The rack is also provided with rests 7, which may be in the form of rods, for supporting base 5 in its horizontal position. In the vertical position base 5 may be held by means of brackets 8 shown in Fig. 2. A base plate 9 is adjustably mounted on base 5 to permit the copy to be accurately positioned in the vertical plane, when the base 5 is in its vertical operating position. An electrode structure 10 is mounted on the base 5 so that it may be swept across substantially the entire area of copy holder 9 to place a charge on a sheet or sheets mounted on any portion of copy holder 9. The electrode structure 10 consists of an arm 11 which may be in the form of a channel, made of aluminum or any other suitable material, rotatably attached to a stanchion 12 which is mounted on base 5. An insulated handle 13 extends from stanchion 12 and is used by the operator for turning the electrode structure 10 so that it sweeps across copy holder 9. The electrode proper of the electrode structure consists of a plurality of wires 14 which are fastened to the bottom of arm 11 in a manner which will be described in detail in connection with Fig. 3. It will be evident that while I have used fine wires to form electrode 14, other types of electrodes capable of conducting currents and producing a corona discharge may be used. The wires constituting electrode 14 may be formed of steel, Phosphor bronze or any other material having sufficient tensile strength to permit the wires to be stretched tightly enough to prevent sagging.

Cooperating with electrode 10 and constituting the opposite pole of the electrostatic unit is an assembly consisting of a metallic base plate 9 rotatable with respect to base 5 on pivot 22, which is in the focal axis of the camera 3. On the base plate 9 is mounted a slidable plate 18 held in place by guides 19, 19' attached to base plate 9. On plate 18 are mounted guides 17, 17' at right angles to guides 19 and 19' and which form a channel in which slidable copy holder 15 is mounted. Thus when base 5 is in vertical position, plate 9 is rotatably adjustable and held in place by a thumbscrew 23 extending through arcuate slot 24 into base 5; plate 18 is adjustable vertically in the direction of arrow 43 by means of wedge 21 operating in a channel 16 attached to plate 9; and plate 15 is adjustable horizontally in the direction of arrow 42 so that the focal center of copy may be aligned with the focal center of the camera and thus positioned properly on the photographic plate in the camera.

Plate 15 is provided with a very thin coating of dielectric material 25. The coating may consist of an acrylic spray containing titanium dioxide having a thickness of about .001". On the dielectric coating 25 there is then applied a very thin sheet of polystyrene 26, for example having a thickness of .001 inch or less, stretched and so fastened at the edges as to be in intimate contact with the dielectric coating 25. After the sprayed coating has had sufficient time to dry thoroughly, it is rubbed with steel wool until it acquires a smooth surface having minimum specularity. Similarly the polystyrene is rubbed with steel wool to minimize its specularity. Such a surface provides a white light-diffusing background and the dielectric properties of the titanium dioxide acrylite and polystyrene minimize the diminution of the electrostatic force holding the copy 20 on the metal plate 15.

Referring particularly to Fig. 3 the electrode structure 10, shown partly in section, consists of the wire 14 bent back on its self to form a plurality of strands which are fixed at one end in an insulating block 27 and at the other end in a similar insulating block 28. Wires 14 are stretched tight so that there will be a minimum of sag and so that the wires will, therefore, remain at a fixed distance from metal plate 15 throughout their length. To facilitate this condition additional insulating spacers 29 and 30 may be provided at intermediate points along the arm 11. The blocks serve the additional important function of preventing the wires from vibrating as a result of the application of the electric potentials. The insulating blocks 29 and 30 may have the wires embedded therein, or they may be used simply as spacers holding wires 14 at a fixed distance from the carrying arm 11. Wires 14 are connected at block 28 to a high voltage source or generator 31 by means of a cable 33 having a loosely coiled portion 32 which permits movement of the electrode 10. The high voltage source or generator preferably produces a D. C. voltage which may be of the order of 10,000 volts, although lower voltages have been found to be useful. Any suitable apparatus, many types of which are known, can be used to generate the desired direct current high voltage. The generator 31 is controlled by a switch 34 mounted on the rack 2 and connected to the high voltage generator by means of conductors 35 and 36. The generator 31 is grounded at point 37. Since the base plate 9 is also grounded by means of conductors 38, generator 31 is effectively connected to wires 14 and metal plate 15, which is conductively mounted on base plate 9. For reasons of safety the arm 11 and stanchion 12 are also grounded by conductor 38, as shown in Fig. 3. A stop 39 is provided on base 5 for supporting the outer end of arm 11 when the base 5 is in its vertical position. For further safety a bleeder resistance 45 and blocking resistance 44 have been provided. The hinges connecting base 5 to board 6 are indicated by reference numerals 40 and 41 in Fig. 3.

Figure 2:
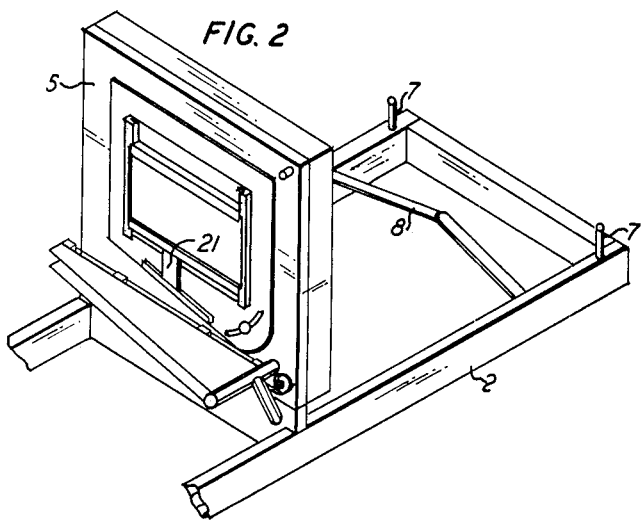
Fig. 2 is an isometric view showing the supporting structure turned into a vertical plane.

In operation the copy 20 to be photographed is placed on metal plate 15 in approximately the position in which it is desired to reproduce it. The switch 34 is then operated to energize the high voltage generator 31 and thus apply a high potential to wires 14 with respect to metal plate 15. The operator then turns arm 11 by means of the handle 13 so as to sweep arm 11 across sheet 20. The arm 11 is then immediately returned to its position against stop 39 as shown in Figs. 1 and 3 and switch 34 is operated to de-energize the high voltage generator 31. The base 5 is then turned to its vertical position where it is held by the bracket 8. If the copy is not in the desired position it can then be adjusted horizontally or vertically by moving it in the guides 17, 17' and 19 and it can also be rotated as required by loosening the thumbscrew and then rotating the base plate 9 to the desired position. The sheet 20 will then be in its desired position and will remain in that position, without further application of potential between the electrodes, for many hours. The sheet 20 remains attached to the plate 15 by virtue of the fact that the wires 14 when passing over the plate 15 produce a corona discharge onto the sheet 20. The charge thus deposited on the sheet or copy 20 remains thereon, since sheet 20 is insulated from plate 15 by means of the dielectric coating on said plate. In passing over the plate 15 and sheet 20, the wires 14 are preferably maintained at a fixed distance therefrom which may, for example, be about a quarter of an inch. It is obvious, of course, that a wide range of other spacings may be used.

Although I have illustrated the principles of my invention in one particular embodiment thereof, it will be evident to those skilled in the art that many variations within the spirit and scope of my invention may be made, and that the principles of my invention may be utilized for holding sheets or other materials on surfaces having any desired contour for various purposes other than the specific ones alluded to herein.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

A photographic copy holder for holding non-conductive sheets comprising a structure having a flat grounded metal facing, a thin coating of dielectric material on the facing for receiving one of said sheets thereon, means for adjustably positioning the structure between a horizontal loading position and a vertical operating position, a charging wire electrode extending at least the length of the facing, means for supporting the electrode wire for movement in a plane parallel to and at a fixed distance from the facing, and means for applying a potential difference between the facing and the electrode wire when the electrode is moved across the surface to produce a corona discharge from the electrode wire to one of the non-conductive sheets on the dielectric coating to statically charge the sheet, the resulting potential difference between the statically charged sheet and the grounded facing being sufficient to hold the sheet against the dielectric coating when the potential is removed from the electrode wire.

References Cited in the file of this patent

UNITED STATES PATENTS

| | | |
|---|---|---|
| 2,487,623 | White | Nov. 8, 1949 |
| 2,583,546 | Carlson | Jan. 29, 1952 |

FOREIGN PATENTS

| | | |
|---|---|---|
| 368,552 | Germany | Feb. 6, 1923 |